US006782915B2

(12) United States Patent
Van Wie

(10) Patent No.: US 6,782,915 B2
(45) Date of Patent: Aug. 31, 2004

(54) VALVE AND TANK ENCLOSURE ASSEMBLY

(75) Inventor: David R. Van Wie, Prior Lake, MN (US)

(73) Assignee: Force America Inc., Burnsville, MN (US)

( * ) Notice: Subject to any disclaimer, the term of this patent is extended or adjusted under 35 U.S.C. 154(b) by 0 days.

(21) Appl. No.: 10/690,950

(22) Filed: Oct. 21, 2003

(65) Prior Publication Data

US 2004/0079414 A1 Apr. 29, 2004

Related U.S. Application Data

(62) Division of application No. 10/041,929, filed on Jan. 7, 2002, now Pat. No. 6,688,328.

(51) Int. Cl.[7] .................................................. A01M 7/00

(52) U.S. Cl. ........................................ 137/354; 137/343

(58) Field of Search ................................ 137/343, 351, 137/354, 899

(56) References Cited

U.S. PATENT DOCUMENTS 2,632,262 A 3/1953 Whittey
3,432,946 A 3/1969 Peitl
4,096,878 A 6/1978 Adams et al.
4,971,092 A 11/1990 Parry et al.
4,999,935 A 3/1991 Simi et al.
5,829,174 A 11/1998 Hadler et al.
5,987,785 A 11/1999 Aguado et al.
6,178,669 B1 1/2001 Quenzi et al.

OTHER PUBLICATIONS

Add–A–Fold™ Valves and Enclosures, Force America Inc., 4 pages (2000).

Self Contained Integral Valve/Reservoir Assembly, Munchie Power Products, Inc., 3 pages, (Date Unknown).

*Primary Examiner*—John Fox
(74) *Attorney, Agent, or Firm*—Merchant & Gould P.C.

(57) ABSTRACT

A valve and tank enclosure assembly for use on a snowplow that includes a frame, a valve assembly, a tank, and a cover. The frame and cover of the enclosure cooperate to provide a seal from water spray. Hydraulic lines within the enclosure are routed such that moisture is prevented from contacting the valve assembly. The tank is mounted within the frame at three-locations and elevated so that forces from vehicle operation are isolated from acting upon the tank. The assembly also includes a pivoting shelf supporting the valve assembly, the pivoting shelf providing wide-open access to the valve assembly from a range of directions.

16 Claims, 14 Drawing Sheets

VALVE AND TANK ENCLOSURE ASSEMBLY

CROSS-REFERENCE TO RELATED APPLICATIONS

This application is a divisional of application Ser. No. 10/041,929, filed Jan. 7, 2002 now U.S. Pat. No. 6,688,328, which application is incorporated herein by reference.

TECHNICAL FIELD

The principles disclosed relate to the operation of hydraulic controls for vehicle equipment. More particularly, this disclosure concerns a hydraulic valve and tank enclosure for use on a heavy-duty snowplow.

BACKGROUND

A wide variety of arrangements have been utilized to operate hydraulic power units of heavy-duty vehicle equipment. Common arrangements for use on a snowplow include an enclosed valve assembly, including a tank or reservoir for containing hydraulic fluid, that is externally mounted to the frame of the snowplow.

In general, improvement has been sought with respect to such arrangements, generally to: better accommodate ease of maintenance and repair, improve sealing and moisture control aspects, improve structural integrity of the reservoir, and provide adaptability for use on a variety of vehicle sizes.

SUMMARY

In one aspect, the disclosure describes a valve and tank enclosure assembly including a reservoir, a valve assembly, and an enclosure. The enclosure includes a frame and a cover.

In preferred constructions, the enclosure and tank provide a gap or channel therebetween. The channel functions in cooperation with edges of the cover to provide a passive seal or labyrinth for preventing road spray from directly entering the enclosure. Preferably, the valve and tank enclosure also includes a hydraulic line and cabling arrangement that prevents moisture from contacting the valve assembly components.

In another aspect, the disclosure describes a three-point tank-mounting arrangement having a triangular configuration that reduces mechanical stresses due to operation of the vehicle. Preferably the tank-mounting arrangement includes mounting brackets which also provide a space between the bottom surface of the reservoir and the frame.

In yet a further aspect, the disclosure describes a pivoting shelf that provides a user with selective access to the valve assembly components and fittings from a range of directions.

It is to be understood that both the foregoing general description and the following detailed description are exemplary and explanatory only and are not restrictive.

DETAILED DESCRIPTION

With reference now to the various figures in which identical elements are numbered identically throughout, a description of various exemplary aspects of the present invention will now be provided.

Figure 1:
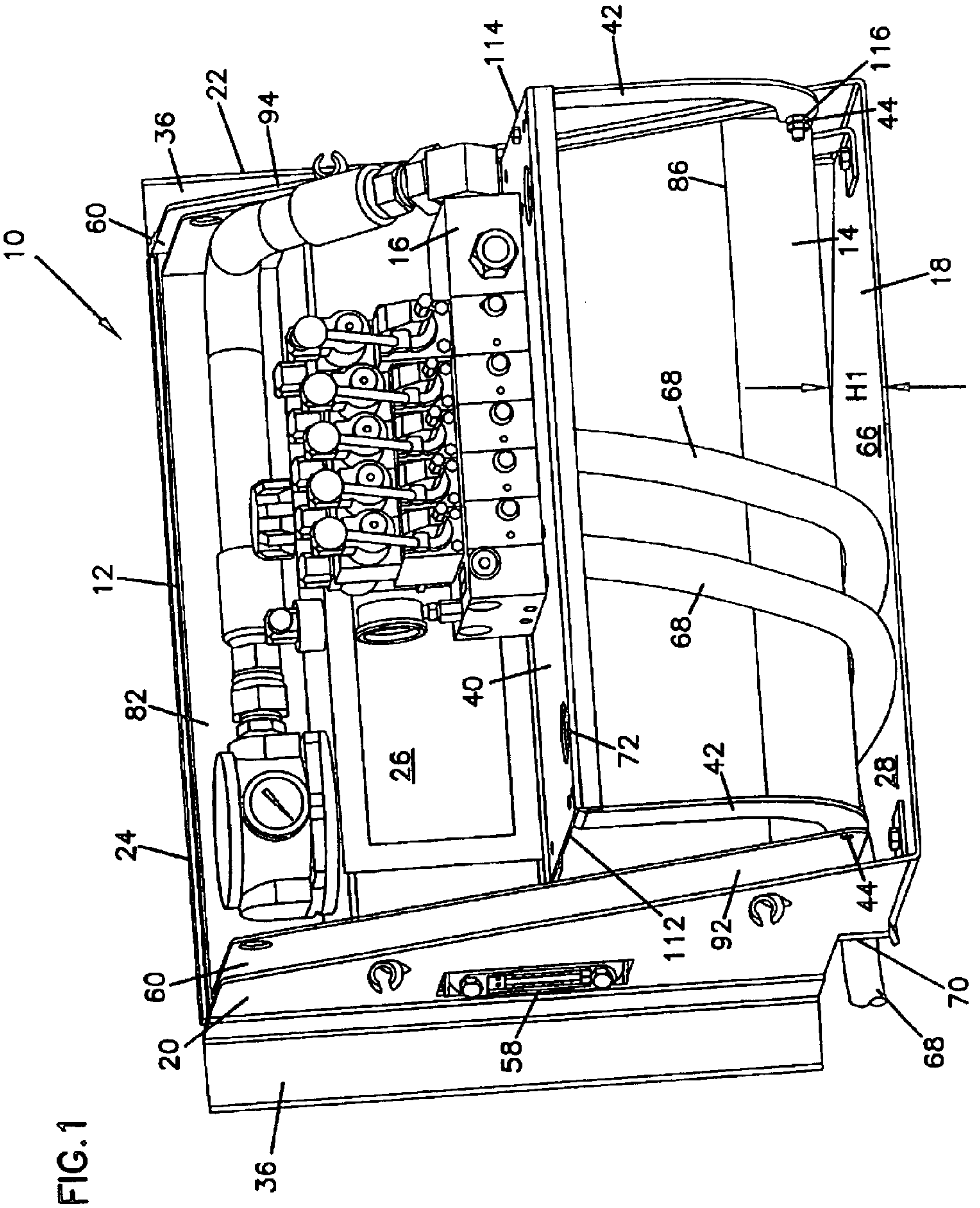
FIG. 1 is front perspective view of the valve and tank enclosure assembly according to the principles disclosed including a valve manifold and a pivoting shelf.
Figure 11:
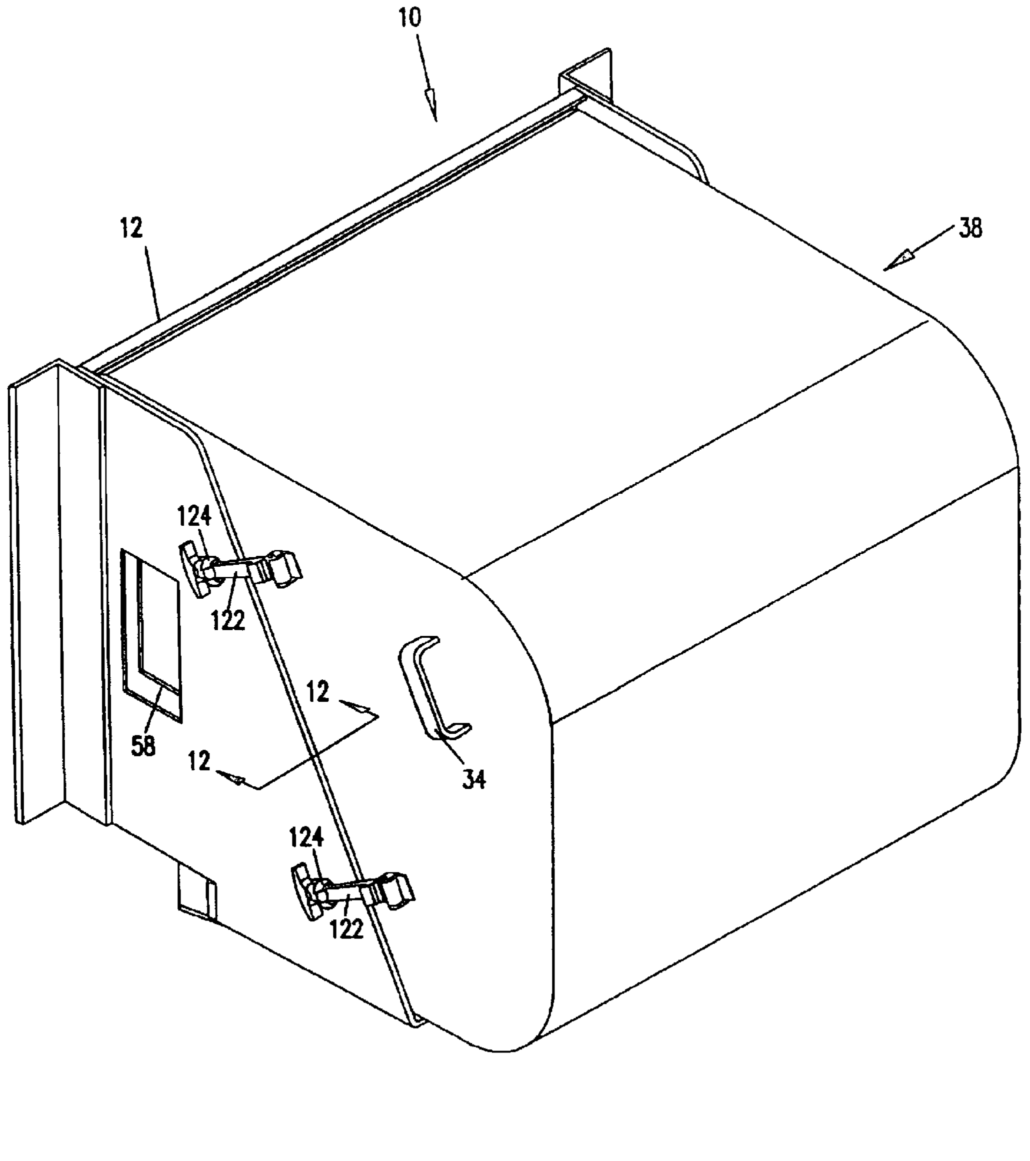
FIG. 11 is a side perspective view showing the cover of FIG. 10 assembled with the valve and tank enclosure assembly of FIG. 1.
Figure 13:
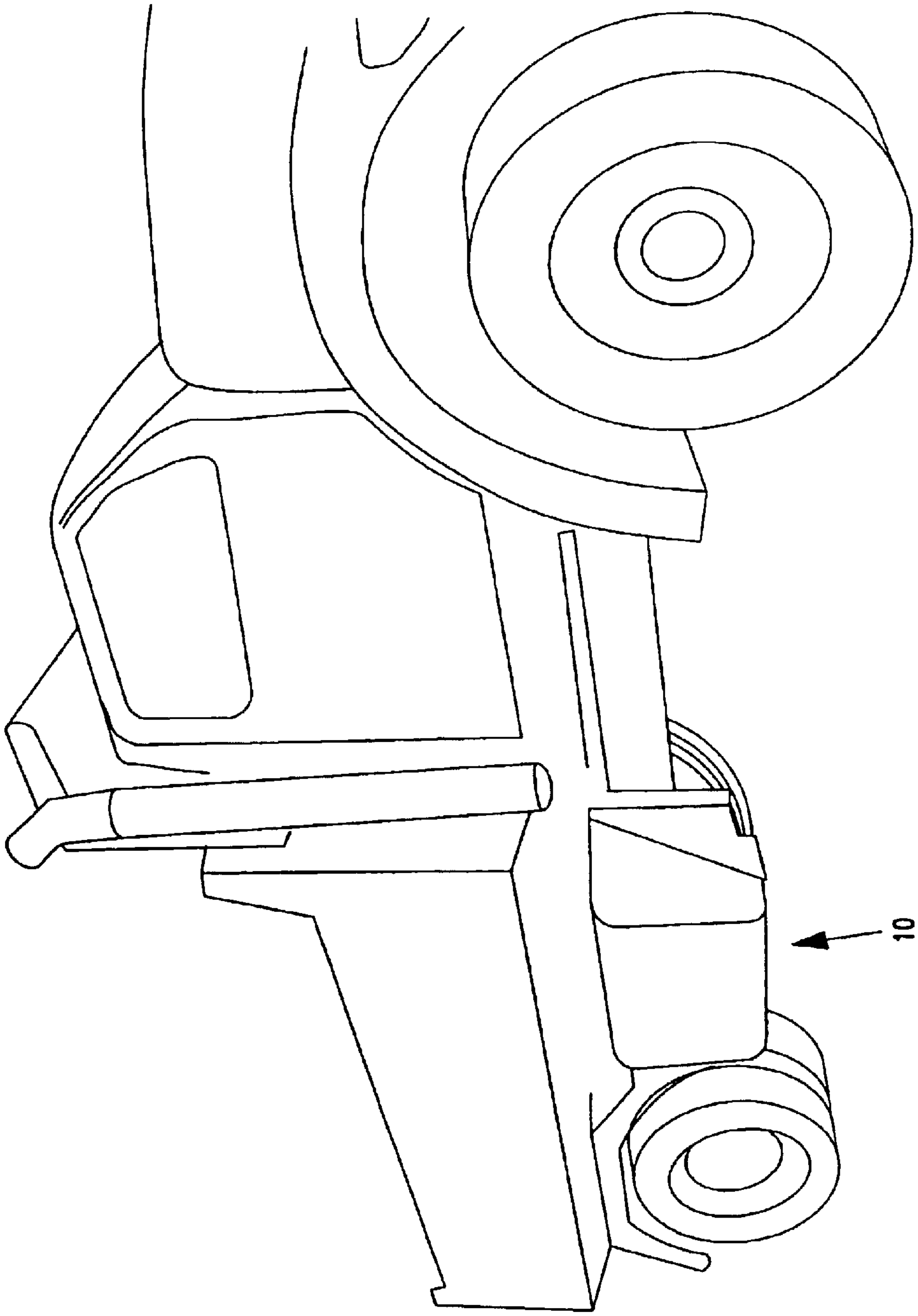
FIG. 13 is a side perspective view of the valve and tank enclosure assembly, according to the principles disclosed, mounted on a snowplow.

FIGS. 1, 11, and 13 illustrate a valve and tank enclosure assembly 10 for use on heavy-duty equipment such as a snowplow according to the principles of this disclosure. The valve and tank assembly 10 includes a tank mounting bracket or frame 12, a tank or reservoir 14, a manifold or valve assembly 16, and a cover 38. The illustration of FIG. 1 depicts the valve and tank enclosure assembly 10 without the cover 38. The illustration of FIG. 11 depicts the valve and tank enclosure 10 with the cover 38. The illustration of FIG. 13 depicts the valve and tank enclosure 10 mounted on a heavy-duty snowplow. The valve and tank enclosure assembly 10 (as shown in FIG. 1) comprises generally an interior upper region 26 and an interior lower region 28.

Figure 2:
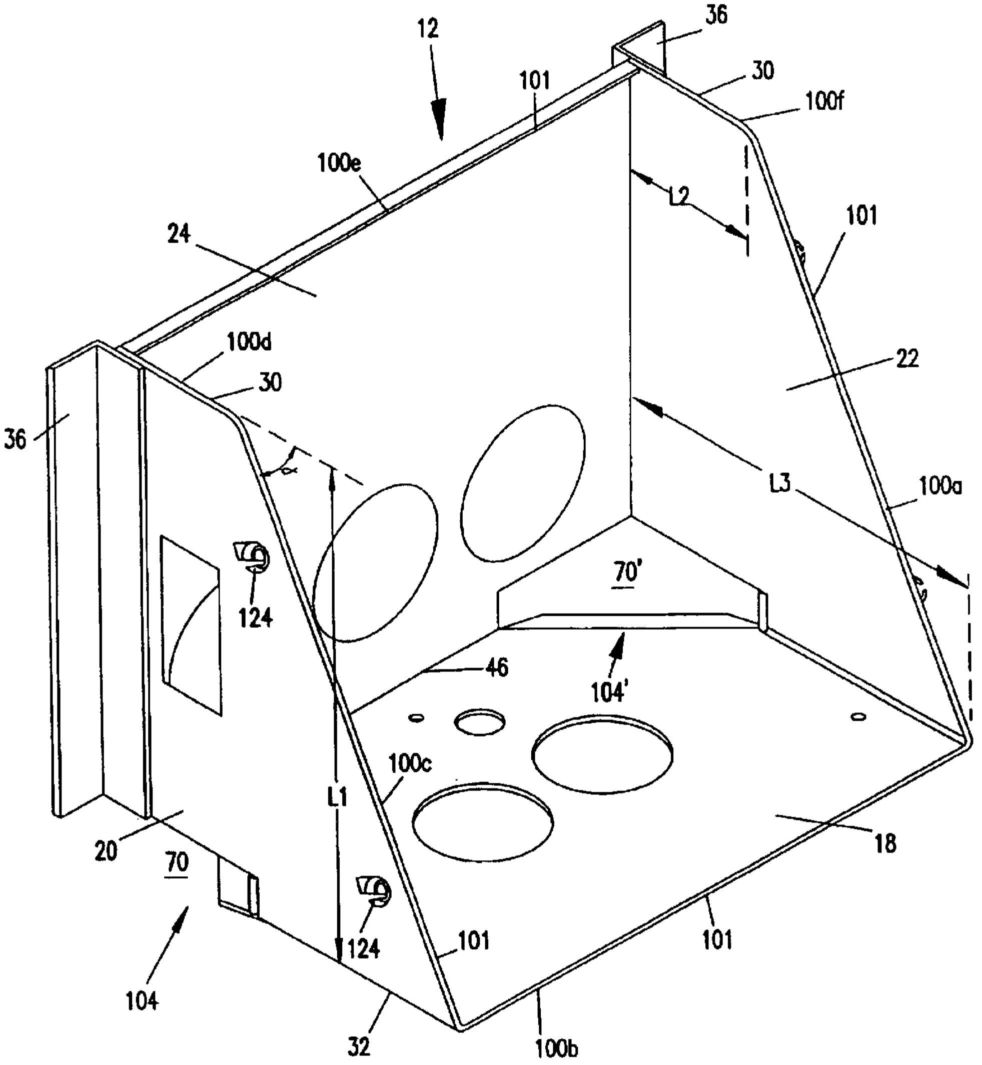
FIG. 2 is a front perspective view of one embodiment of a frame of the valve and tank enclosure assembly of FIG. 1.

Referring to FIG. 2, the frame 12 is arranged in a shelf-like bracket configuration including a bottom frame structure 18, opposing first and second side structures 20, 22 and a rear frame structure 24. Opposing first and second side structures 20, 22 define a vertical length L1 that extends from a top edge 30 to a bottom edge 32. The bottom edge 32 joins the bottom frame structure 18 and the opposing side structures 20, 22. The rear frame structure 24 is joined to the opposing first and second side structures 20, 22 and, in the illustrated embodiment, to the bottom frame structure 18 to form the frame 12. Edges 100$a$–100$f$ of the frame 12 define a perimeter 101.

As illustrated, the side structures 20, 22 of the frame 12 may extend downward from the top edge 30 toward the bottom edge 32 at an angle $\alpha$. As best shown in FIG. 1, this configuration provides lateral access to various components positioned in the upper region 26 of the valve and tank enclosure assembly 10. Preferably, the angle α is acute wherein the top edge 30 has a length L2 that is less than a length L3 of the bottom edge 32 (FIG. 2).

Figure 14:
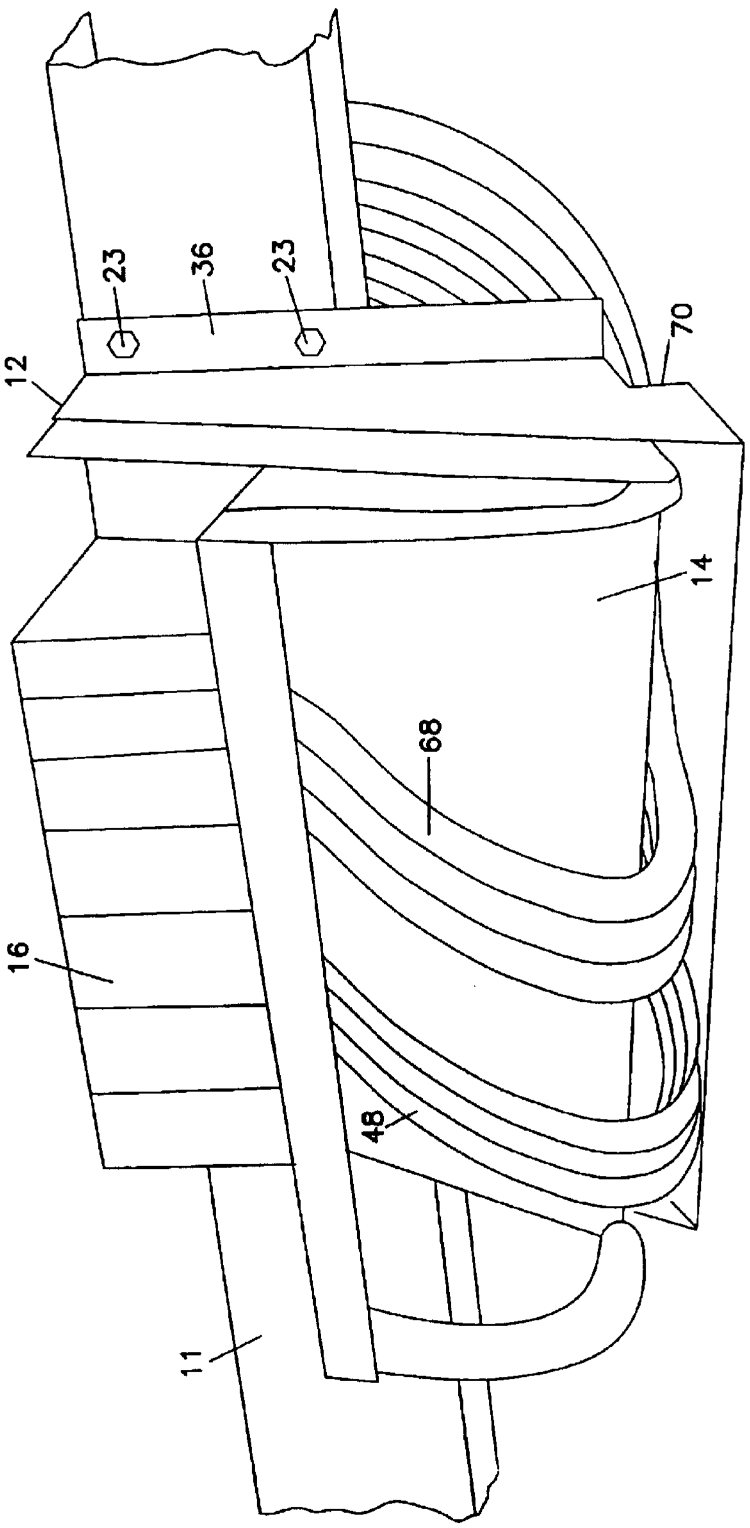
FIG. 14 is a side perspective view illustrating a partial valve and tank enclosure assembly without a cover mounted on the frame of a vehicle, according to the principles disclosed.

The side structures 20, 22 may further include structure for mounting the frame 12 onto the vehicle. In one embodiment, vertical flanges 36 extend from the top edge 30 to the bottom edge 32. The flanges 36 may be attached by weldment to the side structures 20, 22 of the frame 12. Alternatively, a flange or flanges may be oriented horizontally and correspond to another frame component such as the rear frame structure 24 or the bottom frame structure 18, for example. Additionally, the flanges may be an integral component of the side structure 20, 22 or a detachable component of the side structure 20, 22, rather than a weldment. As illustrated in FIG. 14, the flanges 36 may also include apertures for mounting the frame 12 of the valve and tank enclosure assembly 10 to the frame of a vehicle 11 with mechanical fasteners, such as bolts 23, for example.

Figure 3:
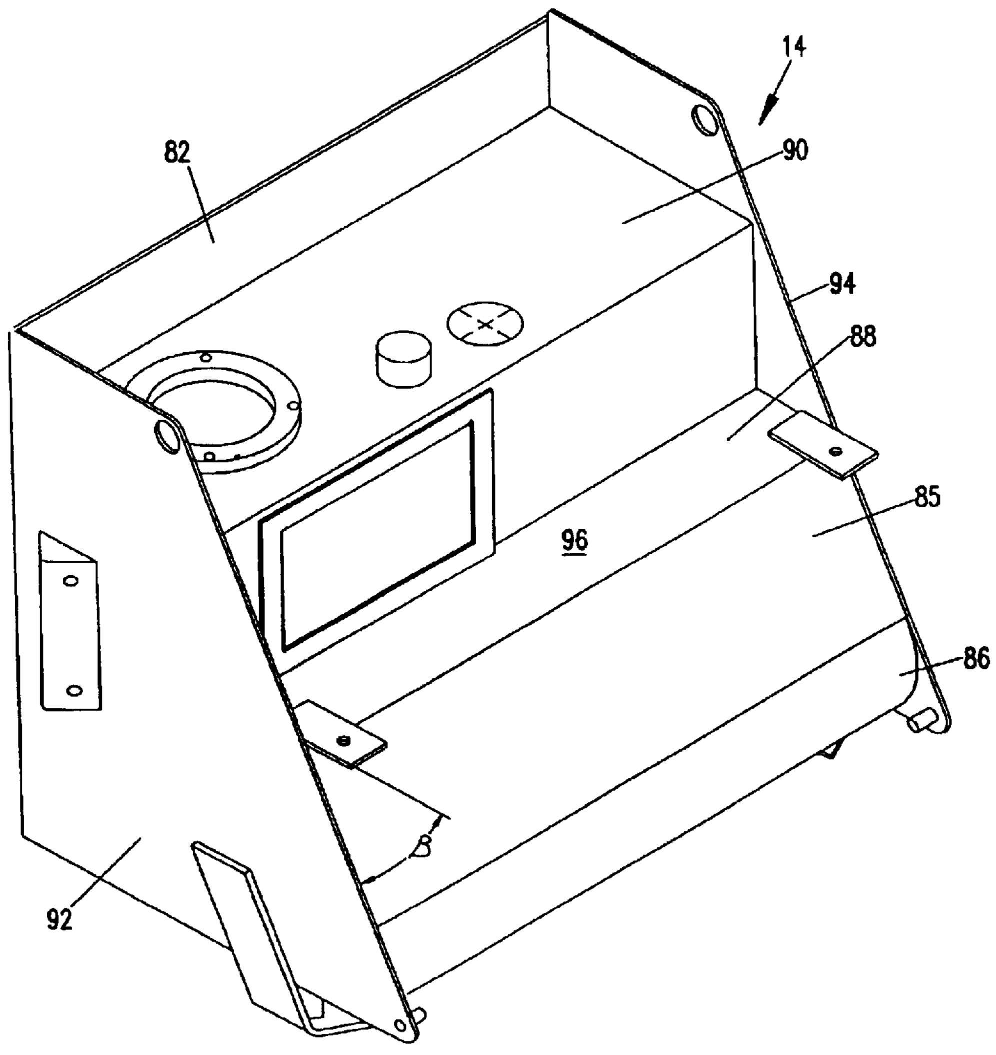
FIG. 3 is a front perspective view of one embodiment of a reservoir of the valve and tank enclosure assembly of FIG. 1.
Figure 4:
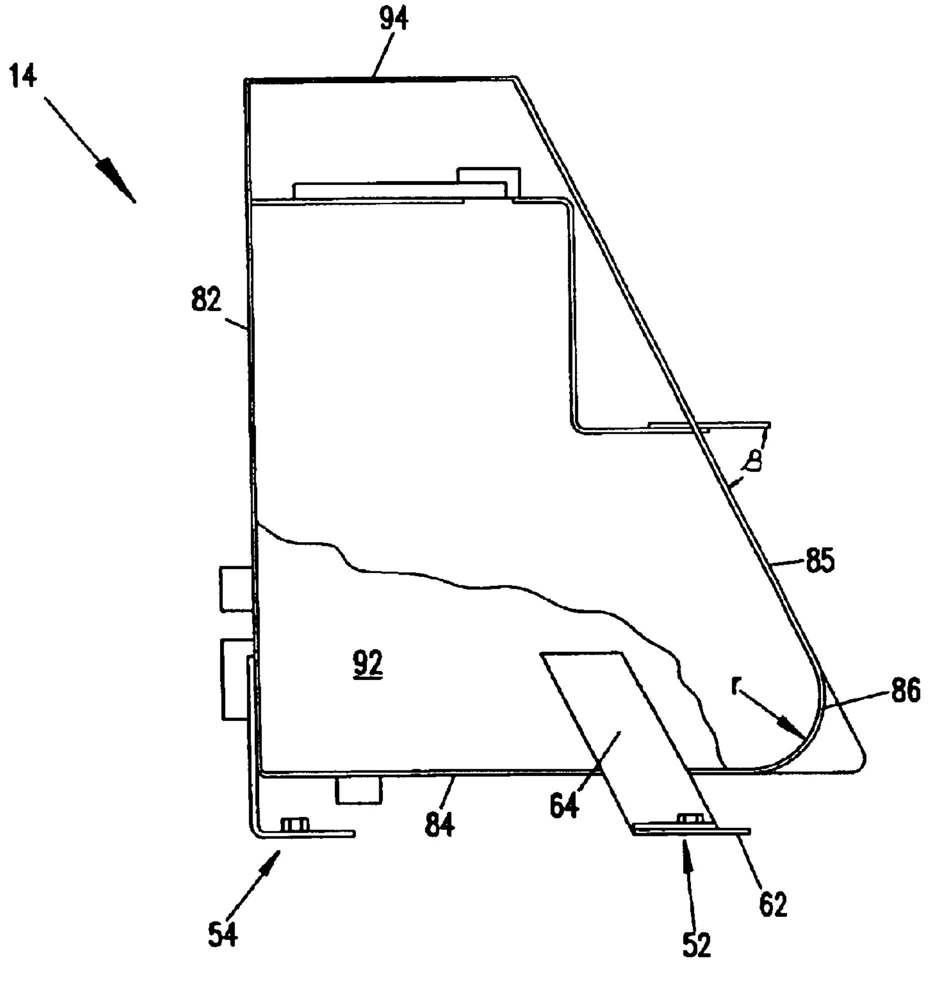
FIG. 4 is a side view of the reservoir illustrated in FIG. 3.

FIGS. 3 and 4 illustrate one preferred construction of the tank or reservoir 14. The reservoir 14 contains hydraulic fluid used to operate hydraulic powered equipment on the vehicle. A significant amount of the weight of the overall unit comprises the tank 14 and its contents. The reservoir includes a back wall 82, a bottom wall 84, a front wall 85 having a curved region 86, a lower shelf 88, an upper shelf 90, and opposing sidewalls 92, 94. The front wall 85 extends downward from the lower shelf 88. Typically, the lower shelf 88 comprises a horizontal surface 96 and the front wall 85 extends outwardly from the horizontal surface 96 at an angle β of about 45 degrees to 90 degrees, preferably about 63 degrees. In the illustrated embodiment, the angle β of the front wall 85 coincides with the angle α of the side structures 20, 22 of the frame 12. In other words, the sidewalls 92, 94 of the reservoir 14 in the preferred embodiment follow the angled configuration of the side structures 20, 22 of the frame 12 to accommodate lateral access to various components located in the upper region 26 of the valve and tank enclosure assembly 10.

The front curved region 86 of the front wall 85 curves to join the bottom wall 84 of the reservoir (best shown in FIG. 4). The curved region 86 comprises a radius r of about 0.1 inch to 10 inches, preferably about 2.5 inches. The configuration of the curved region 86 accommodates hydraulic and cable routing as will be discussed later in this disclosure.

Referring back now to FIG. 1, the reservoir 14 is mounted and secured within the frame 12. Traditional tank mounting arrangements experience chronic leakage problems. Specifically, tanks or reservoirs of the prior art commonly use a tank mounting configuration that rigidly affixes the tank to a support structure. Mechanical stresses from operation of the vehicle cause cracking in the rigidly attached tank structure. This problem leads to other problems associated with cracked and leaking tanks, and ultimately results in further time-consuming and costly repairs.

Figure 5:
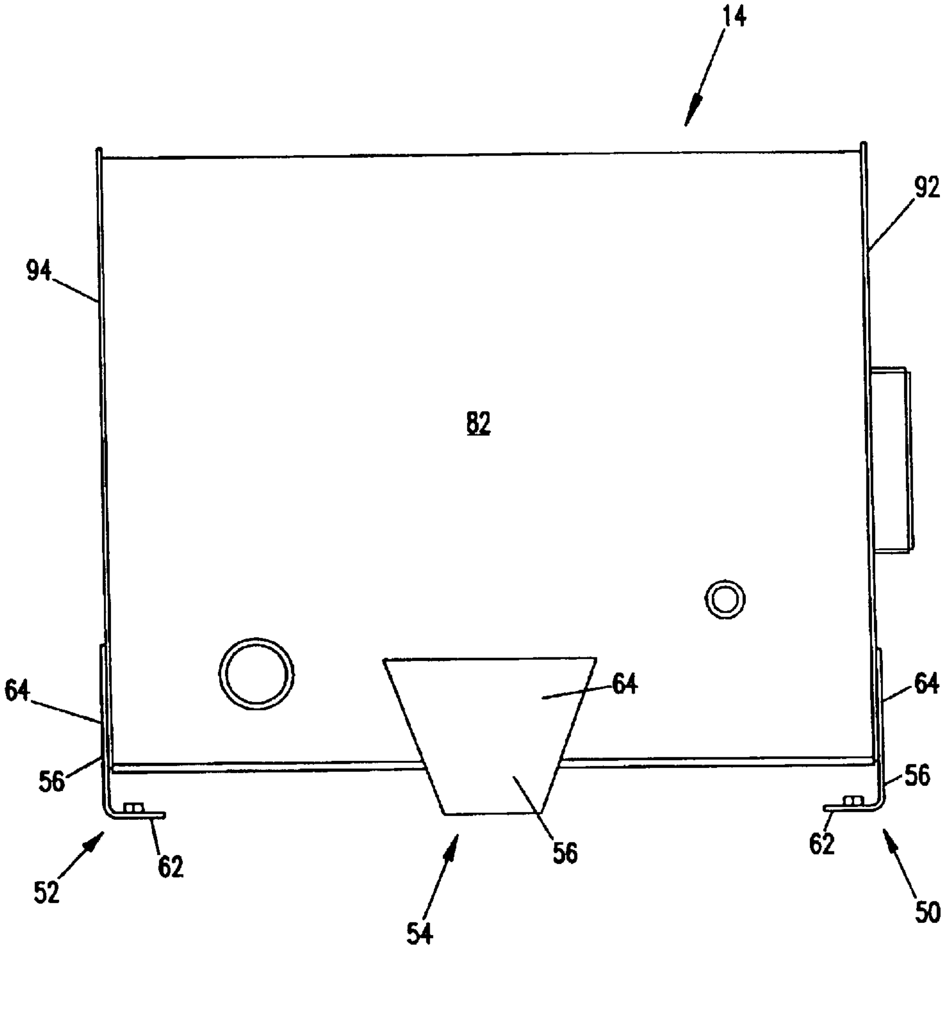
FIG. 5 is a rear view of the reservoir illustrated in FIG. 4.

Referring now to FIGS. 1, 4, and 5, the reservoir 14 in accordance with the principles of this disclosure is mounted to the bottom frame structure 18 of the frame 12 at three points or locations 50, 52, and 54. The mounting locations 50, 52, and 54 are positioned in a triangular configuration. The first mounting location 50 is located proximate the first sidewall 92 toward the front curved region 86 of the reservoir 14. The second mounting location 52 is located proximate the second sidewall 94 and aligned with the first mounting location 50. The third mounting location 54 is generally centered between the first and second mounting locations and located at the back wall 82 of the reservoir 14. Preferably the three mounting locations 50, 52, and 54 are the only locations in which the reservoir 14 is mounted to the frame 12.

The reservoir 14 can be mounted or coupled to the frame 12 by a variety of coupling structures. As illustrated, one structure used to couple the reservoir 14 to the frame 12 includes an L-bracket 56 having a flange portion 62 and an extension portion 64. The extension portion 64 of each bracket 56 provides a space or passageway 66 between the reservoir 14 and the bottom frame structure 18 of the frame 12 (FIG. 1). The L-brackets 56 may be adapted to elevate the reservoir 14 to provide a predetermined passageway height H1. Other brackets or coupling structures having a variety of structural configurations which provide a passageway 66 between the bottom frame structure 18 and reservoir 14 are contemplated.

The three-point mounting configuration of this disclosure addresses the problem in industry of cracking tank structures. Specifically, traditional arrangements fixedly secure the tank to a support structure in at least four locations. These mounting arrangements create a rigid couple or link between the tank and the support structure. Vibrations and other torsional and transaxial forces due to operating the dump body over rough terrain or operating the vehicle at higher speeds, for example, cause mechanical stress to act upon the rigidly coupled tank structure. The mechanical stresses degrade the structural integrity of the tank and subsequently result in cracking and leakage.

The three-point mounting configuration isolates the reservoir from torsional loads. In particular, mounting the reservoir 14 to the frame 12 at only three points and in an elevated position permits the frame 12 to flex without transmitting this deflection to the reservoir 14; thereby reducing stress loads and lessening the likelihood of reservoir cracking.

Figure 6:
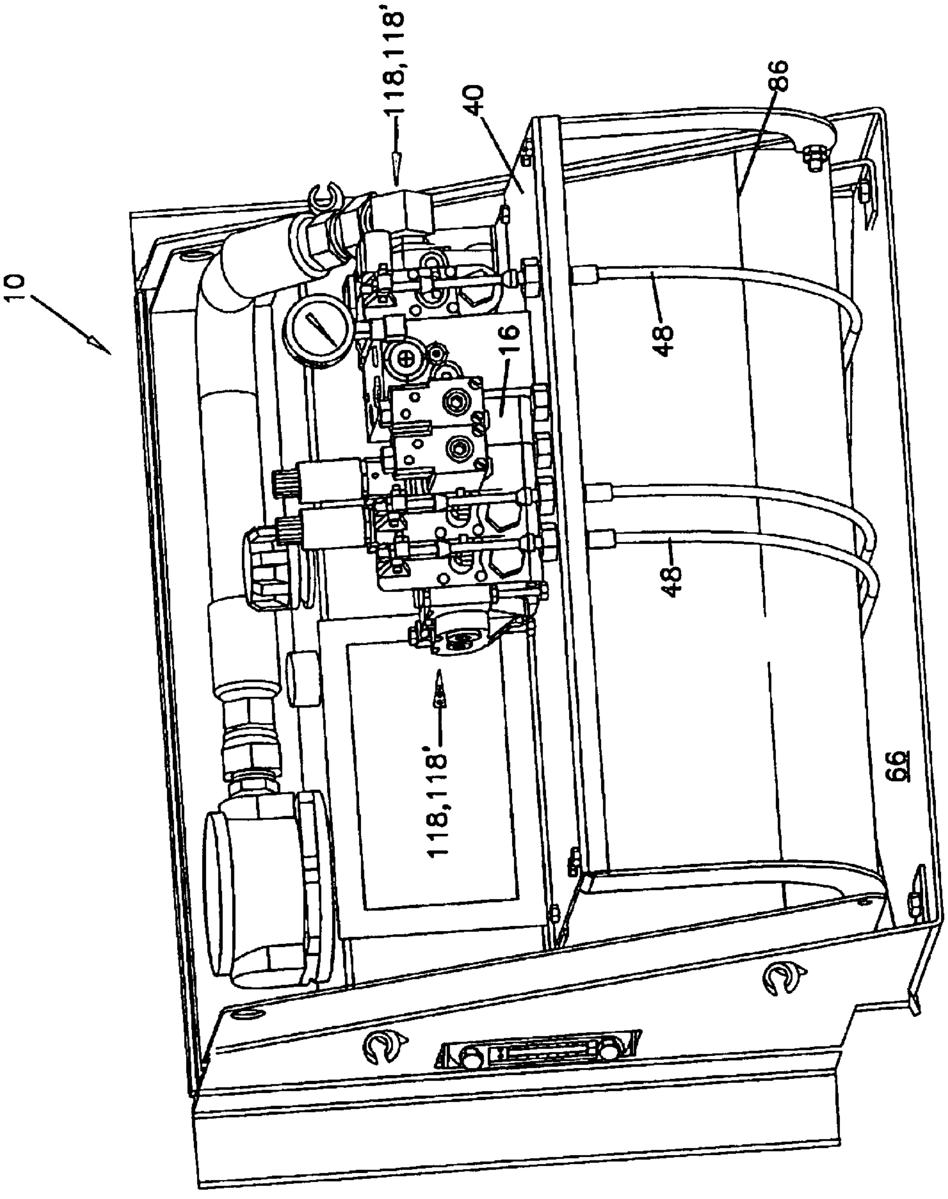
FIG. 6 is a front perspective view of another embodiment of the valve and tank enclosure assembly similar to FIG. 1, this embodiment illustrating an alternative valve arrangement and cabling connections.
Figure 7:
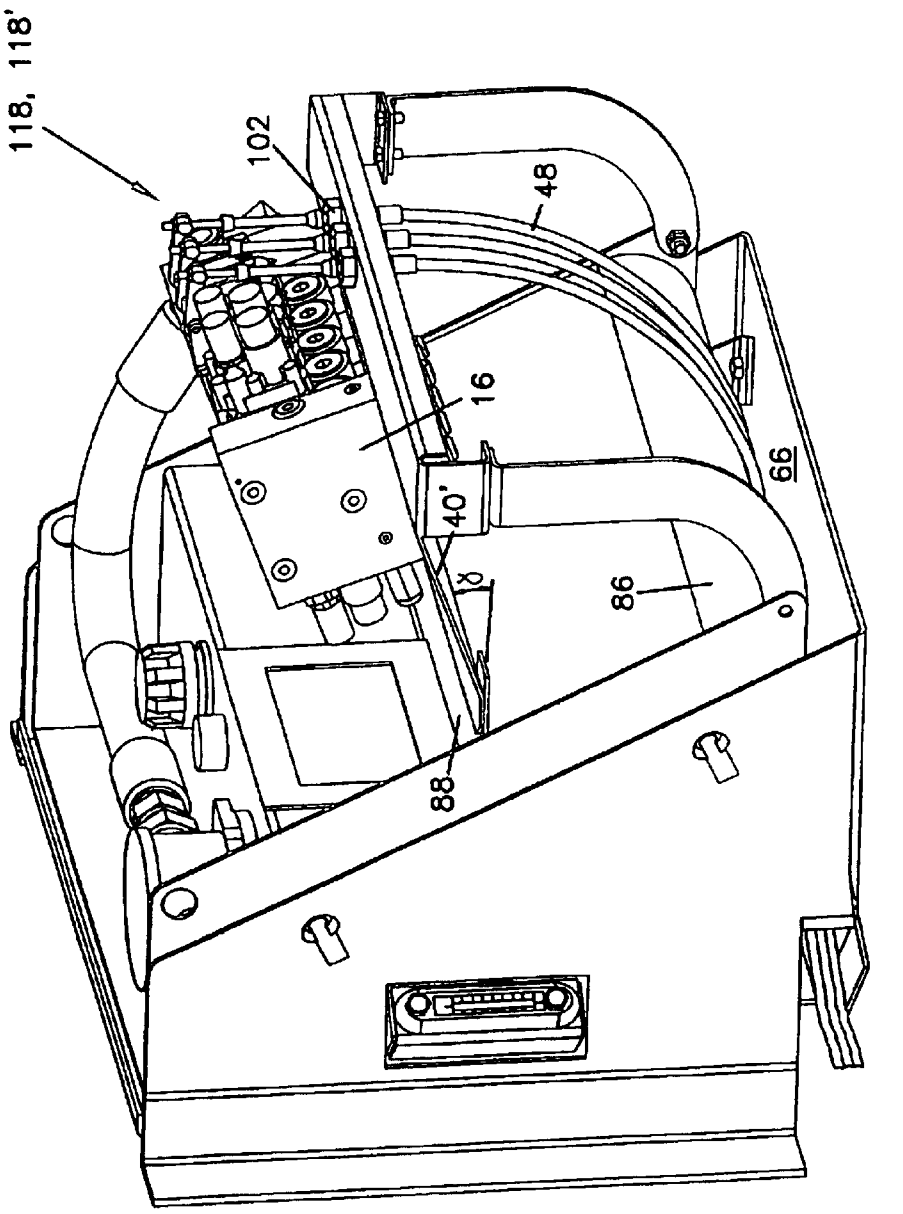
FIG. 7 is a side perspective view of yet another embodiment of the valve and tank enclosure assembly similar to FIG. 1 illustrating another valve manifold arrangement and an angled pivoting shelf configuration.

Referring now to FIGS. 1, 6, and 7, the manifold or valve assembly 16 may comprise of a variety of valve assembly configurations. Individual valve components of the valve assembly 16 are operated by cabling connections 48 (shown in FIGS. 6 and 7) that selectively control pressurized fluid communication from the reservoir 14 to hydraulically actuated components (not shown) on the vehicle. The pressurized fluid is transported by flexible hydraulic plumbing, hoses or lines 68 (shown in FIG. 1).

Figure 8:
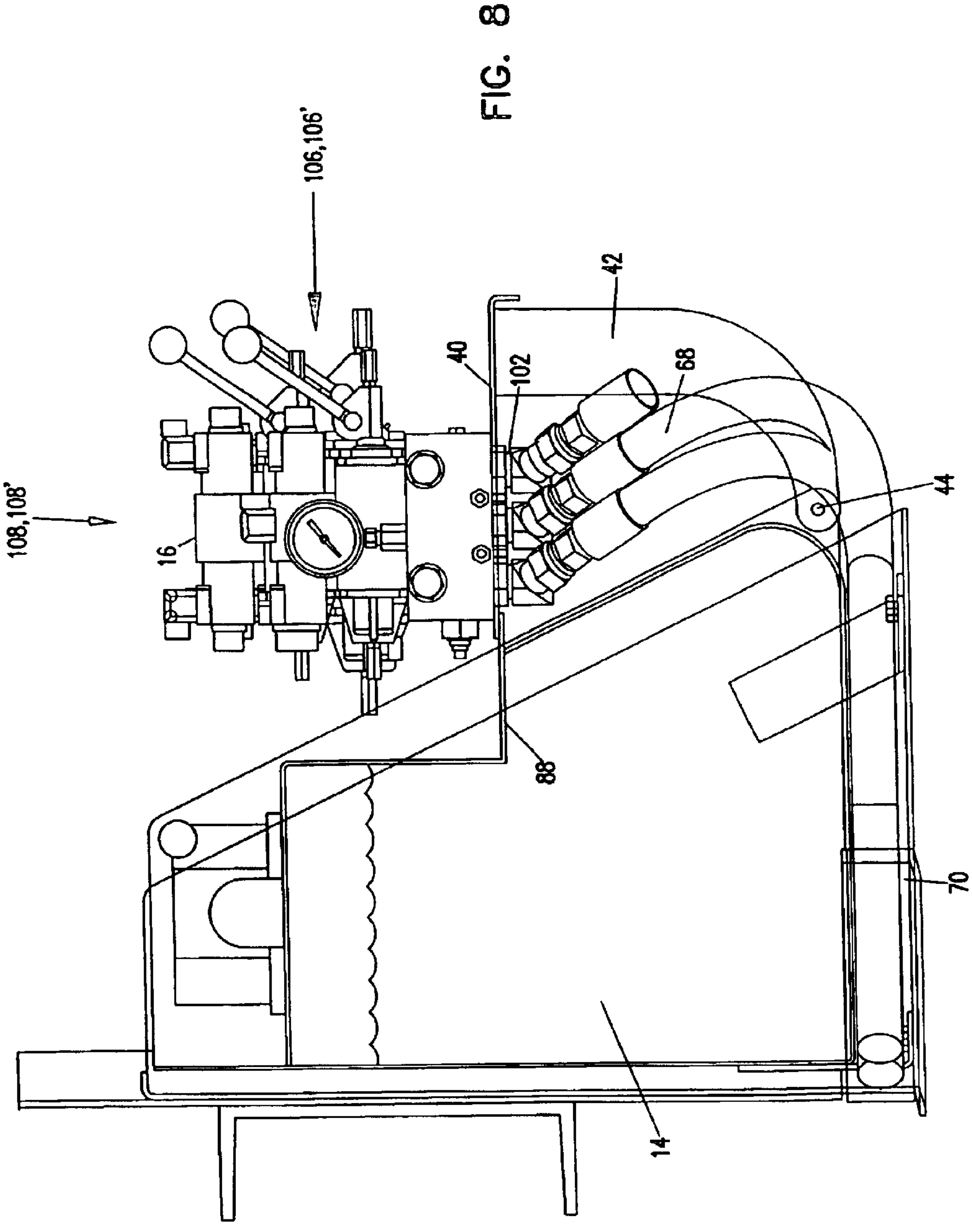
FIG. 8 is a side view of the valve and tank enclosure of FIG. 1 with the pivoting shelf in an upright position and showing hydraulic line connections.
Figure 9:
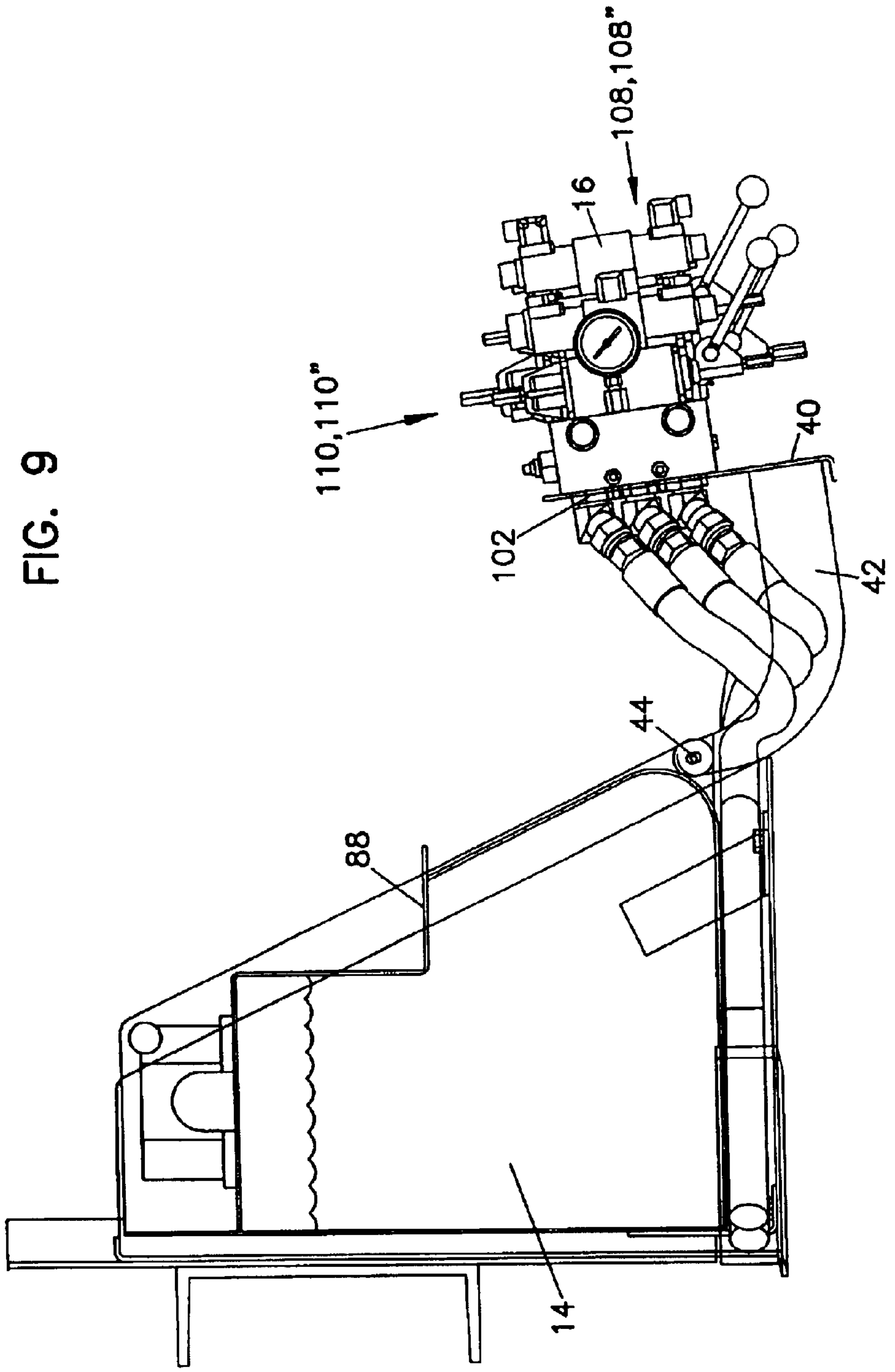
FIG. 9 is a side view of the valve and tank enclosure of FIG. 8 with the pivoting shelf opened.

As illustrated in FIGS. 8 and 9, the valve assembly 16 is secured to a support member or shelf 40. The shelf 40 is detachably secured to the lower shelf 88 of the reservoir 14. As illustrated in FIG. 6, the shelf 40 may extend horizontally from the lower shelf 88. In an alternative embodiment, such as that shown in FIG. 7, the shelf 40' may extend from the lower shelf 88 at an angle γ. The angle of the shelf may range from 0 degrees, in which the valve assembly is mounted in a horizontal orientation, to 90 degrees, in which the valve assembly is mounted in a vertical orientation. In the illustrated embodiment of FIG. 7, the shelf 40' extends upward at an angle of about 25 degrees to 45 degrees. In an alternative embodiment, the shelf may extend downward to provide better accessibility to different valve assembly configurations.

The shelf 40, as shown in FIG. 1, includes notches, cutouts, or apertures 72 sized to accommodate hydraulic lines 68, cabling 48, and associated fittings or connections 102. The hydraulic lines 68 extend from the valve assembly 16, through apertures 72, and through the passageway 66. Similarly, FIGS. 6 and 7 show cabling 48 coupled to the valve assembly 16 and running from the valve assembly 16, through apertures 72 in the shelf 40, and through the passageway 66. Although shown separately in various illustrations, the valve and tank enclosure assembly may include both hydraulic lines 68 and cabling 48 that extend through corresponding apertures 72.

The plumbing and cabling arrangement in accordance with the principles disclosed route the line and cable components downwardly from the valve assembly 16 and around the front curved region 86 of the reservoir 14. The front curved region 86 is curved to accommodate the lines 68 and cables 48 so that the lines and cables are not cut or severed by a sharp edge. The front curved region 86 further aids in guiding the lines and cabling such that the bend radius of line and cable components is not exceeded. Exceeding the bend radius may result in line or cable kinking.

Referring to FIGS. 1, 2 and 14, the hydraulic lines 68 and cabling 48 exit the assembly 10 through an opening 70 in the frame 12. It is contemplated that the opening 70 may extend along an entire lower back edge 46 of the frame 12. Alternatively, first and second openings 70, 70' may be located in opposing side corners 104, 104' of the frame 12 as shown in FIG. 2. The arrangement of the lines 68 and the cabling 48 and the location of the openings 70, 70' reduce the overall envelope of the valve and tank enclosure assembly 10. This configuration eliminates the necessity of accommodating line and cable components that exit from the sides of enclosures, as found in traditional arrangements. The reduced envelope size of the valve and tank enclosure assembly 10 therefore can be used on a wider variety of sized vehicles.

Routing the hydraulic lines 68 and the cabling 48 to exit from the bottom rear openings 70, 70', in combination with the designed, upper region placement of the valve assembly 16 also provide a ‘passive sealing’ advantage. One problem in the industry concerns road spray entering enclosure apertures located near moisture-susceptible components, such as the valve assembly. Typically, conventional designs include holes located on the sides of the enclosure through which hydraulic lines and cabling are routed. To resolve the problem of road spray entering these hole, conventional designs use bulkhead fittings that seal against the interior and exterior surfaces surrounding the hole. Bulkhead fittings not only increase the cost of the assembly, but also require additional plumbing connections located within an already cramped enclosure making maintenance and repairs difficult.

In the disclosed arrangement, any moisture that may accumulate will collect at the lower region 28 of the enclosure. The valve assembly 16 is arranged in the upper region 26 of the valve and tank enclosure assembly 10 so that such moisture does not contact moisture-susceptible components. Further, the hydraulic lines and cabling exit the enclosure in the lower region. In this arrangement, even road spray that may enter through the opening is prevented from reaching moisture-susceptible components located in the upper region 26. Specifically, moisture cannot travel along the hydraulic lines 68 from the rear of the enclosure toward the front of the enclosure, make a 90-degree bend to travel up the hydraulic lines 68, and travel through the aperture 72 in the shelf 40. Therein, the disclosed arrangement protects moisture-susceptible components, such as the valve assembly 16, from moisture contact.

Moreover, the openings 70, 70' permit any moisture collected within the lower region 28 of the valve and tank enclosure assembly 10 to exit the enclosure assembly. The moisture is expelled or passively discharged through the openings 70, 70'. Additionally the openings 70, 70' aid to evaporate moisture by providing ventilation through the enclosure assembly. This ventilation advantage is further enhanced by the ‘passive seal’ design, which will be discussed in further detail with regards to the cover 38 and frame 12.

Referring again to FIGS. 8 and 9, the shelf 40 contributes to protecting moisture-susceptible components from moisture contact. In addition, the shelf 40 positions the valve assembly 16 for wide-open accessibility. Arranging and positioning the valve assembly 16 in the upper region 26, in combination with the angled edges of the frame 12 and reservoir 14, permit a maintenance person to access front valve components 106 of the valve assembly 16 with only having to remove the front cover 38 (cover 38 shown in FIG. 11).

The shelf 40 is fixedly coupled to arms 42. In the preferred embodiment, two arms are positioned on opposing ends 112, 114 of the shelf 40 (shown in FIG. 1). The arms 42 are connected to the sidewalls 92, 94 of the reservoir 14 at pivot connections 44. The arms 42 are configured to permit the shelf 40 to swing or hinge downward and away from the reservoir 14 without interfering with the reservoir 14 or frame 12. In the preferred embodiment, the pivot connections 44 comprise pin connections 116. Other pivoting connections known by those with skill in the art are contemplated.

The valve assembly 16 and shelf 40 are shown in an upright position in FIG. 8. There is accessibility to the front valve components 106 of the valve assembly 16 as well as the hydraulic lines, cabling, and associated fittings located beneath the shelf 40. FIG. 9 illustrates the shelf 40 pivoted downwardly to a pivoted position that provides access to rear valve components 110 of the valve assembly 16. The pivoted position also provides access to the hydraulic lines, cabling, and associated fittings from an alternative direction.

Many conventional arrangements include an assembly enclosure, mounted on the side of the vehicle, having hard-plumbed and fixedly mounted components. The hard-plumbed and fixedly mounted arrangements restrict access to the various mechanical and electrical components that require periodic maintenance. Thus, routine maintenance operations are ordinarily difficult to effect and often require disconnection and removal of the entire valve assembly, for example. These conventional arrangements make maintenance operations time consuming and expensive.

The arrangement according to the principles of this disclosure provides access to all valve and fitting components of the valve assembly from a range of directions by selectively pivoting the shelf 40. A maintenance person can therefore access the valve assembly 16 without removing the entire valve assembly 16 from the shelf 40. Specifically, the shelf 40 can be oriented in an upright position (shown in FIG. 8) where the valve assembly 16 is exposed for accessibility to front valve components 106 from a first direction 106', to top valve components 108 from a second direction 108', and to side valve components 118 from side directions 118' (shown in FIG. 6). Pivoting the shelf 40 downward (shown in FIG. 9) orients the shelf 40 and valve assembly 16 to a position where the valve assembly 16 is exposed for accessibility to top valve components 108 from the fourth direction 108", to side valve components 118 from another side direction (not shown), and to rear valve components 110 from a fifth direction 110". It is to be understood that the shelf 40 may be pivoted to a position intermediate the positions shown in FIGS. 8 and 9. In essence, the pivoting shelf 40 tips the valve assembly 16 in a range of shelf orientations to provide access to the valve components from an even greater range of directions.

In transition from an upright position to a pivoted position, the hydraulic lines 68 and cabling 48 follow the movement of the pivoting shelf 40. Movement of the hydraulic lines 68 and cabling 48 is accommodated by the downwardly depending line and cable arrangement and the passageway 66 between the reservoir 14 and the bottom frame structure 18 of the frame 12. In other words, the depending hydraulic lines and cabling arrangement, the reservoir mounting arrangement, and the pivoting shelf work in conjunction to accommodate the translation or pivotal movement of the shelf 40 and valve assembly 16. This feature permits a maintenance person to access any valve assembly component without having to remove the lines, cables, or the valve assembly itself.

Figure 10:
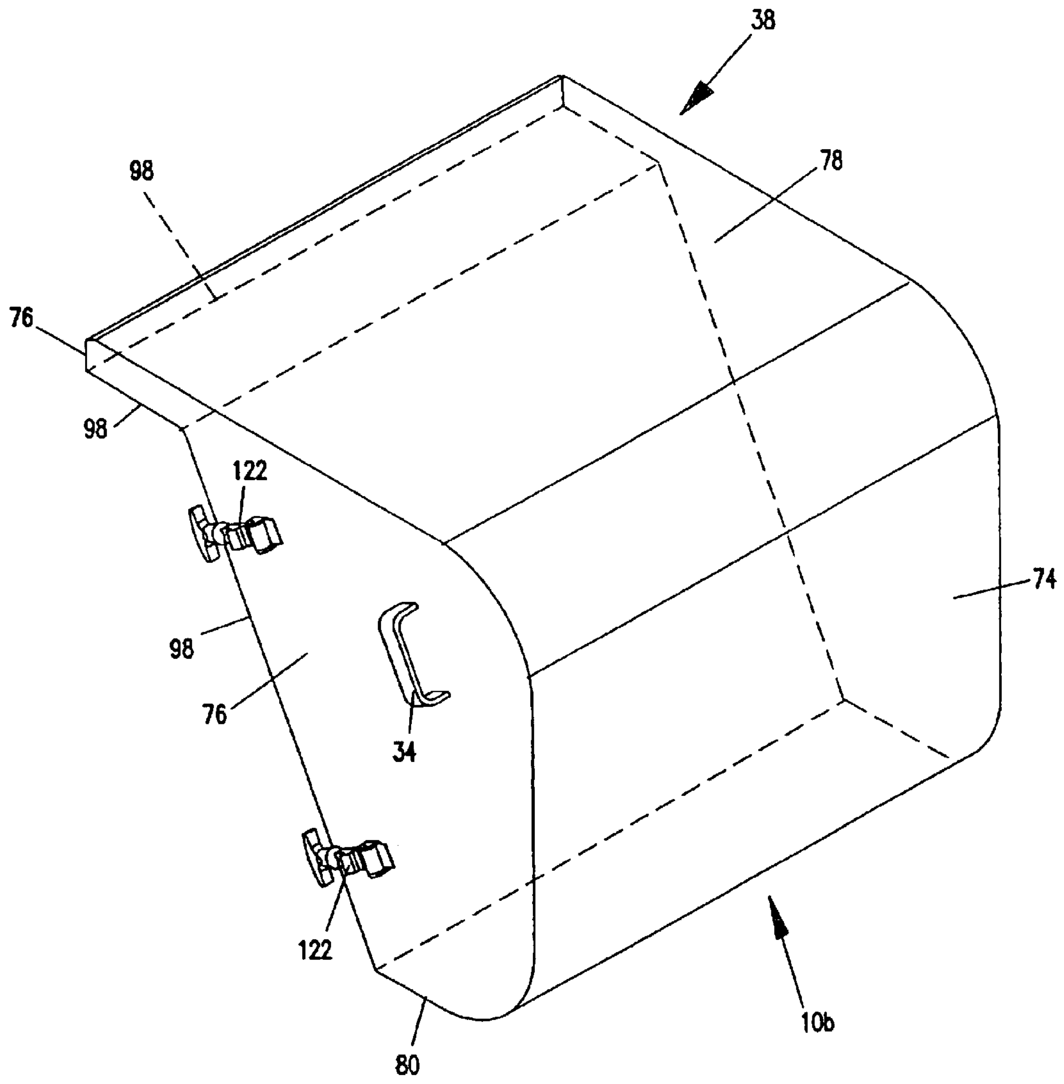
FIG. 10 is a perspective view of one embodiment of a cover used in accordance with the principles disclosed.

Referring now to FIGS. 1, 10, and 11, the cover 38 of the valve and tank enclosure assembly 10 protects the enclosed components from road spray or other environmental conditions. The cover 38 generally comprises a front cover portion 74, opposing side cover portions 76, a top cover portion 78, and a bottom cover portion 80. Handles 34 are attached to the opposing side portion 76 of the cover 38 for removal or placement of the cover 38. Cover attachments 122 are positioned on the side cover portions 76 to secure the cover 38 to corresponding attachment pieces 124 located on the side structures 20, 22 of the frame 12. The illustrated attachments 122 comprise rubber fastener devices. It is contemplated that attachments including, for example, attachments having a lock mechanism or attachments comprising steel fasteners or a combination thereof can also be used to secure the cover 38 to the frame 12.

As described earlier, the reservoir 14 is mounted within the frame 12. The arrangement is designed to formed a gap or channel 60 between the frame 12 and the reservoir 14. The channel 60 extends along the perimeter of the frame 12. Edges 98 of the cover 38 fit within the channel 60 to complete the valve and tank enclosure assembly 10.

Figure 12:
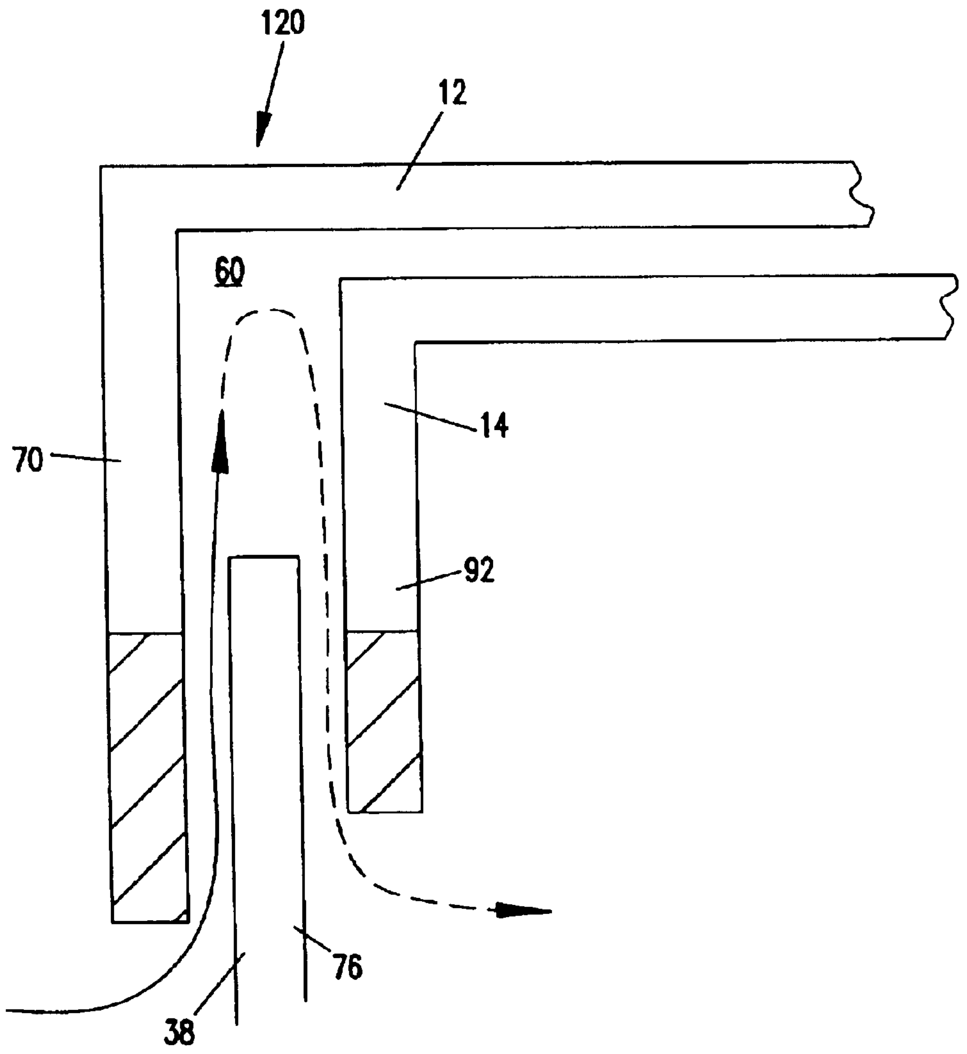
FIG. 12 is a cross-sectional view taken from the line 12—12 of FIG. 11.

The channel 60 cooperates with the edges 98 of the cover 38 to create a 'passive seal' or labyrinth 120, as shown in FIG. 12. The labyrinth 120 functions to prevent water spray from directly entering into the interior of the enclosure while permitting discharge of moisture from the interior of the frame to the environment.

To illustrate, during vehicle operation, road spray having a significant amount of force acts upon the valve and tank enclosure assembly 10. Spray is prevented from directly entering the enclosure and contacting the valve assembly 16 and fittings 102 by the maze or labyrinth 120 through which the spray must travel to enter the enclosure. As shown by arrows, spray entering the enclosure from the environment is diverted along the channel 60. To access the internal components, moisture would be required to travel a 180-degree turn (as shown by the dashed arrow). Moisture entering is rather directed down the channel 60 and toward the lower region 28 of the enclosure assembly. Directing the moisture to the lower region 28 of the valve and tank enclosure assembly 10 prevents subsequent moisture contact with moisture-susceptible components located in the upper region 26 (as discussed with regards to the hydraulic line and cabling arrangement).

In keeping with the principles of this disclosure, the side structures 20, 22 of the embodiment shown in FIG. 1, for example, may include an aperture 58 for access to instrumentation. The channel 60 and sidewall 92 design of the reservoir 14 shield the valve assembly 14 from road spray and directs any entering moisture toward the lower region 28 of the enclosure assembly 10. The arrangement of the valve assembly 16, the hydraulic lines 68, and the cabling 48 work in cooperation with the frame 12 and cover 38 to provide an overall arrangement that reduces or eliminates moisture problems found in conventional designs.

The above specification, examples and data provide a complete description of the manufacture and use of the composition of the principles disclosed. Since many embodiments can be made without departing from the spirit and scope of the principles disclosed, the invention resides in the claims hereinafter appended.

I claim:

1. A method of accessing a valve assembly of a hydraulic assembly unit, said method comprising the steps of:

(a) providing an enclosure assembly, said enclosure assembly including:

(i) a reservoir in fluid communication with the valve assembly;

(ii) a pivoting shelf upon which said valve assembly is coupled, said valve assembly having a front side, a rear side, and a top side;

(iii) a detachable cover;

(b) removing said detachable cover; and (c) selectively accessing said front side, said rear side, and said top side of said valve assembly, without uncoupling said valve assembly from said pivoting shelf by pivoting said shelf and said valve assembly to a selected orientation.

2. The method of accessing a valve assembly according to claim 1, said method further comprising the steps of:

(a) accessing said front side and said top side of said valve assembly from a first direction;

(b) pivoting said shelf and valve assembly to the selected orientation to expose said front side, said top side, and said rear side of said valve assembly for access from a second direction.

3. The method of accessing a valve assembly according to claim 2, wherein pivoting said shelf and valve assembly to the selected orientation includes pivoting said shelf and valve assembly in a range of approximately 0 to 90 degrees from an originating upright position.

4. A method of accessing a valve assembly of a hydraulic assembly unit, said method comprising the steps of:

(a) providing a reservoir in fluid communication with the valve assembly, and a shelf upon which said valve assembly is mounted;

(b) pivoting said shelf to one of a plurality of angular orientations to permit selective access to the valve assembly from a plurality of directions, said pivoting being accomplished without removing said valve assembly from said pivoting shelf.

5. The method of claim 4, wherein said valve assembly includes:

(a) at least one valve; and (b) an input hydraulic line and an output hydraulic line coupled to the valve;

(c) wherein pivoting the shelf is accomplished without having to uncouple the input or output hydraulic lines from the valve.

6. A hydraulic arrangement, said arrangement comprising:

(a) a pivoting shelf, the pivoting shelf having a mounting surface;

(b) a valve assembly mounted to the mounting surface of the pivoting shelf;

(c) a mounting structure, the pivoting shelf being coupled to the mounting structure and configured to pivot relative to the mounting structure from a non-pivoted position to a plurality of pivoted positions to provide access to a number of sides of the valve assembly;

(d) wherein the valve assembly is accessible when the pivoting shelf is in the non-pivoted position.

7. The hydraulic arrangement of claim 6, wherein the valve assembly includes at least one valve, an input line coupled to the valve and an output line coupled to the valve, the valve assembly being arranged to pivot with the shelf without removing the valve, input line, or output line of the valve assembly.

8. The hydraulic arrangement of claim 7, wherein the valve assembly further included a cable coupled to the valve for operation of the valve, the valve assembly being arranged to pivot with the shelf without removing the cable.

9. The hydraulic arrangement of claim 7, wherein the output line extends downward from the mounting surface of the pivoting shelf when the pivoting shelf is in the non-pivoted position.

10. The hydraulic arrangement of claim 7, wherein the output line extends through an aperture formed in the mounting surface of the pivoting shelf.

11. The hydraulic arrangement of claim 6, wherein the shelf is selectively pivotable from the non-pivoted position to a first pivoted position, the non-pivoted position providing access to a top side of the valve assembly, the first pivoted position providing access to a bottom side of the valve assembly.

12. The hydraulic arrangement of claim 11, wherein the valve assembly includes a plurality of hydraulic lines extending from the valve assembly, and wherein the arrangement is configured to pivot the valve assembly from the non-pivoted position to the first pivoted position while accommodating movement of the hydraulic lines.

13. The hydraulic arrangement of claim 12, wherein the shelf is configured to pivot approximately 90 degrees from the non-pivoted position to the first pivoted position.

14. The hydraulic arrangement of claim 6, further including an arm interconnected to the shelf, the arm also coupled to the structure at a pivot location to permit the shelf to pivot relative to the structure to the plurality of pivoted positions.

15. The hydraulic arrangement of claim 14, including a pair of arms interconnected to the shelf and coupled to the structure at pivot locations.

16. The hydraulic arrangement of claim 6, wherein the mounting surface of the pivoting shelf is oriented at an angle relative to horizontal.

* * * * *